(12) United States Patent
Comair et al.

(10) Patent No.: US 7,330,769 B2
(45) Date of Patent: Feb. 12, 2008

(54) PARAMETERIZED INTERACTIVE CONTROL OF MULTIPLE WAVE TABLE SOUND GENERATION FOR VIDEO GAMES AND OTHER APPLICATIONS

(75) Inventors: Claude Comair, Vancouver (CA); Rory Johnston, Bellevue, WA (US); Lawrence Schwedler, Sammamish, WA (US); James Phillipsen, Seattle, WA (US)

(73) Assignee: Nintendo Software Technology Corporation, Redmond, WA (US)

( * ) Notice: Subject to any disclaimer, the term of this patent is extended or adjusted under 35 U.S.C. 154(b) by 0 days.

(21) Appl. No.: 10/145,596

(22) Filed: May 15, 2002

(65) Prior Publication Data

US 2003/0045956 A1  Mar. 6, 2003

Related U.S. Application Data

(60) Provisional application No. 60/290,665, filed on May 15, 2001.

(51) Int. Cl.
*G06F 17/00* (2006.01)
*H03G 3/00* (2006.01)

(52) U.S. Cl. .......................... 700/94; 381/61
(58) Field of Classification Search .................. 700/94, 700/17; 84/604, 605, 606, 600 X, 626, 627, 84/629, 658, 663, 737; 381/61; 463/35, 463/34; 715/700, 727
See application file for complete search history.

(56) References Cited

U.S. PATENT DOCUMENTS

| | | | |
|---|---|---|---|
| 3,821,714 A | 6/1974 | Tomisawa et al. ....... 340/172.5 |
| 4,131,049 A | 12/1978 | Okumura et al. ............ 84/1.01 |
| 4,138,915 A | 2/1979 | Nagai et al. .................. 84/1.22 |
| 4,258,602 A | 3/1981 | Niimi et al. .................. 84/1.01 |
| 4,402,243 A | 9/1983 | Deforeit ...................... 84/1.01 |
| 4,419,919 A | 12/1983 | Kashio ........................ 84/1.27 |
| 4,554,854 A | 11/1985 | Kato ........................... 84/1.03 |
| 4,597,318 A | 7/1986 | Nikaido et al. ............... 84/1.22 |
| 4,685,134 A | 8/1987 | Wine ............................ 381/17 |
| 4,754,680 A | 7/1988 | Morikawa et al. ........... 84/1.22 |
| 4,924,744 A | 5/1990 | Yamamura .................... 84/601 |
| 5,076,133 A | 12/1991 | Toda ........................... 84/624 |
| 5,164,530 A | 11/1992 | Iwase .......................... 84/624 |
| 5,195,920 A * | 3/1993 | Collier ....................... 446/409 |

(Continued)

FOREIGN PATENT DOCUMENTS

WO  WO 9916049 A1 *  4/1999

OTHER PUBLICATIONS

Pham, "Music Takes on a Hollywood Edge", *Los Angeles Times*, 2 pages, Dec. 27, 2001.

*Primary Examiner*—Sinh Tran
*Assistant Examiner*—Andrew C Flanders
(74) *Attorney, Agent, or Firm*—Nixon & Vanderhye P.C.

(57) ABSTRACT

In the context of a video game, multimedia presentation or other application, multiple sound sample files are read out simultaneously and mixed together. The volumes and/or pitches of the wave tables are parameterized to allow a single parameter (e.g., power, intensity, etc.) to simultaneously control the multiple read out processes. The control parameter may be, for example, responsive to a user-manipulable control, such as a joystick. Sound effects produced using this technique are rich and interesting, and the user feels as if he or she is directly controlling the effect.

18 Claims, 11 Drawing Sheets

U.S. PATENT DOCUMENTS

| | | |
|---|---|---|
| 5,243,124 A | 9/1993 | Kondratiuk et al. ......... 84/624 |
| 5,268,528 A | 12/1993 | Iwase ......................... 84/660 |
| 5,354,948 A | 10/1994 | Toda ......................... 84/624 |
| 5,477,004 A | 12/1995 | Kunimoto .................... 84/625 |
| 5,814,751 A | 9/1998 | Imamura ..................... 84/604 |
| 5,936,182 A * | 8/1999 | Izumisawa .................. 84/623 |
| 5,998,724 A * | 12/1999 | Takeuchi et al. .............. 84/622 |
| 6,169,241 B1 * | 1/2001 | Shimizu ...................... 84/605 |
| 6,297,818 B1 * | 10/2001 | Ulrich et al. ............ 715/500.1 |
| 6,425,827 B1 * | 7/2002 | Nimura ....................... 463/35 |
| 6,757,573 B1 * | 6/2004 | Ledoux et al. ................ 700/94 |

* cited by examiner (Creating a Sound Model)

(Generating Sound)

PARAMETERIZED INTERACTIVE CONTROL OF MULTIPLE WAVE TABLE SOUND GENERATION FOR VIDEO GAMES AND OTHER APPLICATIONS

CROSS-REFERENCES TO RELATED APPLICATIONS

This application claims the benefit of U.S. Provisional Application Ser. No. 60/290,665, filed May 15, 2001, and having the same title as the instant application, the entire disclosure of which is incorporated by reference herein.

FIELD OF THE INVENTION

This invention relates to computer-generated sounds, and more particularly to sound effect generation within a video game or other interactive multimedia presentation. In more detail, this invention relates to a method and apparatus for using a common parameter to control the volume and pitch of sound waves from plural, substantially simultaneously read out wave tables. The invention further relates to sound generation using multiple waveforms whose pitch and volume are adjusted using multiple parameters and then mixed together to create a final sound. The parameters are preferably directly related to a game play condition or feature that is at least partially controlled by the user, thereby enabling the sound effects to correspond to the content and/or status of the game or other multimedia presentation in a very realistic and dynamic manner.

BACKGROUND AND SUMMARY OF THE INVENTION

Sound effects have long been used in video game and other computer-generated sound applications. A variety of techniques are known for generating sound effects by computer. One common technique involves using a microphone and recording equipment to record actual sounds from the real world, and storing such sounds in a wave table for real-time read out and reproduction during video game play. Sounds can also be recorded in a wave table through use of a musical synthesizer. The resulting sound effects can be very realistic—adding realism and enjoyment to the entertainment experience.

In some circumstances, it may be desirable to allow the video game player to in some sense control the sound effect. For example, in a driving game, it is desirable for an engine noise sound effect to respond to user manipulation of a "throttle" control (which, for example, may be an actual pedal in an arcade game, but in a home video game context is typically a joystick or other hand-held control). Similarly, in a boat racing game, realism can be increased by changing the sound corresponding to the rate at which waves lap the fiberglass hull of a virtual boat in response to the speed at which the virtual boat is traveling as well as its direction. In other contexts, it may be desirable to change a sound effect depending on what is going on in the game. For example, as the intensity of a virtual rain storm increases, the sound of falling rain should change from a light patter to a driving roar.

One way to accomplish such effects is to provide multiple wave tables storing different variations (i.e., different waveforms) on the same sound effect, and to cross fade from one wave table to another. Thus, for example, as the intensity of a rain storm increases, it is possible to cross fade from one sound effect wave table storing the sound of light rain falling to another sound effect wave table storing the sound of driving rain. In other words, this technique involves storage and playing of a single waveform that represents a real-world sound, or choosing between various waveforms that represent the different types of related sounds. For example, one waveform may represent the sound of a car hitting a wall at 10 mph and another waveform may represent the sound of the car hitting a wall at 100 mph. The appropriate waveform is then selected based on the event for which a sound effect is desired. While this technique has successfully been used to create sound effects in video games and other applications, further improvements in the methodology of sound generation for such applications is desired in order to further increase the realism thereof in a dynamic and exciting manner.

We have now developed and implemented an improved method and system for dynamically generating realistic sound effects in interactive multimedia applications, such as, but not limited to, videogame applications. The improved method and system involves reading out a number of different sound effect wave tables substantially simultaneously, and mixing them together with parameterized volume and pitch read out transfer function characteristics to provide a mixed, complex sound based on a number of wave table outputs. The resulting real-time interactive sound modeling technique allows us to use a continuously-variable user interactivity parameter (e.g., such as that produced by an analog joystick or other interactive control) to provide excellent real-time sonic feedback to the user.

In accordance with the invention, a single "sound," such as a car hitting a wall, is represented as multiple waveforms whose pitches and volumes are adjusted by one or more parameters. The adjusted waveforms are then mixed together to create a final sound that is output through an audio system. The number of parameters used and what they each represent can vary depending on the particular application in which the invention is implemented. More particularly, the number of different waveforms used and the number of different parameters used to adjust the characteristics of each of the waveforms, as well as what each parameter represents, is determined by the nature of the sonic event being modeled, thereby allowing a high degree of realism and complexity regardless of the particular application in which the invention is employed.

In accordance with the invention, one or more sound models are defined and stored for the sonic event(s) (or sonic environment(s)) that can occur in the multimedia application (e.g., videogame). The sound model includes all information describing how the one or more sounds that are part of the sound model are adjusted by the one or more parameters that are defined in the model. Thus, the sound model includes one or more waveforms, one or more parameters, and, for each waveform and each parameter, a corresponding pitch and volume adjustment function (or graph) referred to herein as an envelope. Thus, in the preferred embodiment, for each waveform and parameter in a sound model of the invention, there is a pitch adjustment function (or envelope) and a volume adjustment function (or envelope). These envelopes define how the pitch and volume of each waveform in the model are adjusted by the current value of each parameter in the model to determine the appropriate adjusted waveform at any particular time during the application.

The parameters may be any suitable parameter, such as the speed at which a player controlled object is moving, the angle at which a player controller object hits another object, the power that the player is giving to a player controller object, etc. The parameters are preferable defined such that they relate (either directly or indirectly) to an action that the player has taken in the game or a condition that the player has caused in the game. For example, one parameter may be the speed at which the player is driving a virtual vehicle, while another parameter may the angle at which the player has caused his virtual vehicle to hit another virtual vehicle or obstacle. A single parameter or multiple parameters may be used in accordance with the invention.

In addition, the waveforms in the sound model are preferably selected to represent various sounds that can occur as result or a real-world experience being represented in the multimedia application. For example, in a driving game, one waveform could represent the sound of the vehicle engine, another waveform could represent the sound of the exhaust pipes, another waveform could represent the sound of the wind, and still another waveform could represent the sound of the tires contacting the road surface. In accordance with the invention, each of the waveforms in the sound model have their pitch and volume (and possible other sound characteristics, such as, for example, attack and decay) parameterized using the particular parameters selected for the sound model. The sound model is then used to dynamically generate real-time final sound for the application, by determining current values of the parameters based on the current application condition (e.g., the current gameplay condition), adjusting the volume and pitch of the waveforms based on current value of the parameters, and mixing the adjusted waveforms together to obtain the final sound.

In accordance with the invention, when multiple waveforms having overlapping pitches and volumes are used in the sound model, together with multiple parameters that adjust those pitches and volumes, very complex and realistic sounds are created, thereby enhancing the gameplay experience or other type of interactive experience in which the invention is implemented.

BRIEF DESCRIPTION OF THE DRAWINGS

These and other features and advantages of the present invention will be better and more completely understood by referring to the following detailed description of presently preferred example embodiments in conjunction with the drawings, of which.

DETAILED DESCRIPTION OF PRESENTLY PREFERRED EXAMPLE EMBODIMENTS

Figure 1:
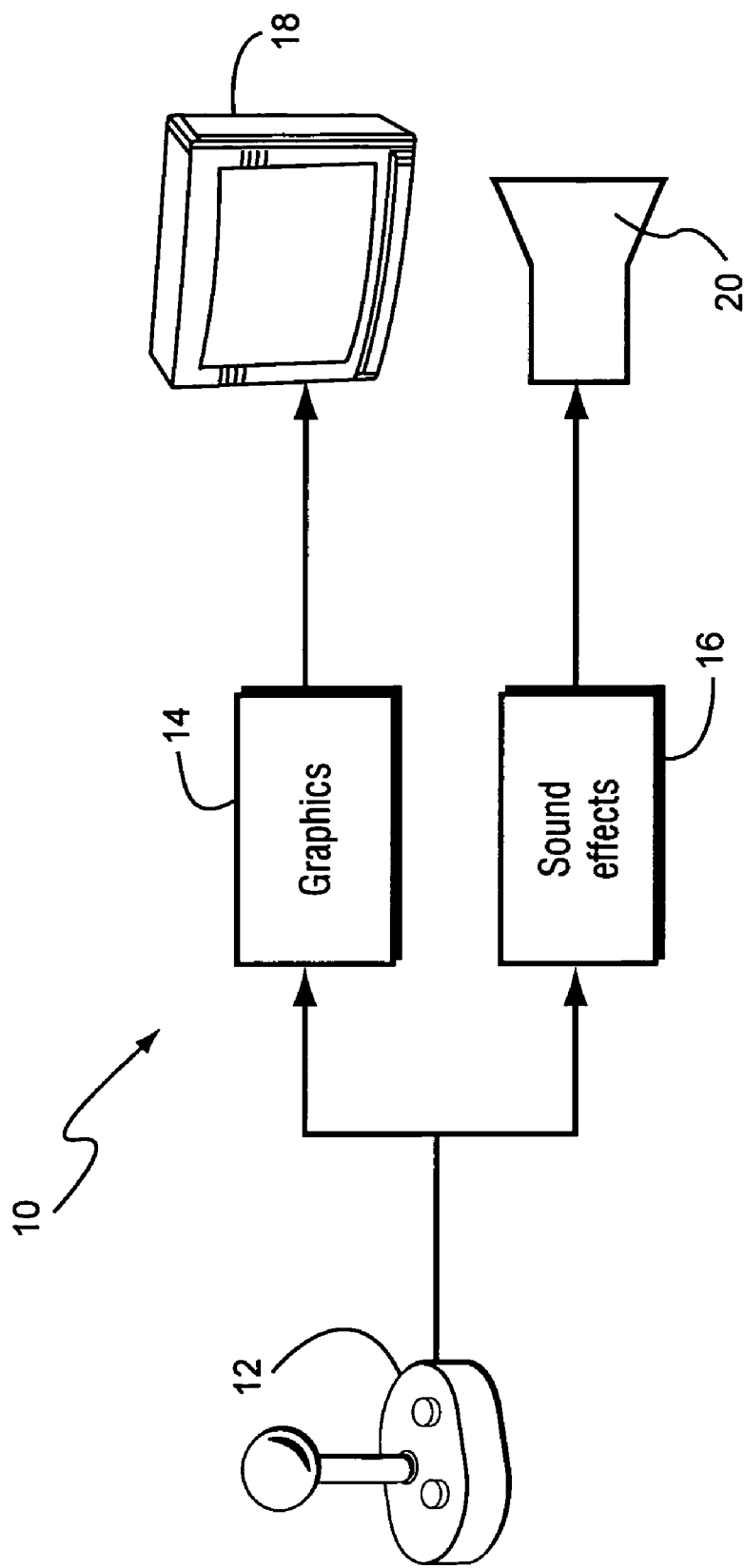
FIG. 1 shows a high level block diagram of an example multimedia presentation system 10 with which the preferred embodiment of the present invention may be used.

FIG. 1 shows an example block diagram of a multimedia system 10 such as a home video game system with which the present invention may be used or employed. In the example embodiment, system 10 includes a user-manipulable control 12 such as a continuously-variable analog joystick. The user-manipulable control 12 controls graphics generation via a graphics engine 14 as well as sound effect generation via a sound effect generator 16. The graphics generator 14 produces interesting 2D or 3D graphics for display on a display device 18 such as home color television set or other display device. The sound effects generator 16 provides interesting sound effects for reproduction by one or more loudspeakers 20.

In one example embodiment, the graphics generator 14 and sound effects generator 16 may be implemented in hardware and/or software on a personal computer and/or in a home video game platform such as the NINTENDO 64 or NINTENDO GAMECUBE system. Basic sound generation and/or synthesis using these types of platforms is well known. See, for example, U.S. Pat. No. 6,166,748 to Van Hook et al, entitled "INTERFACE FOR A HIGH PERFORMANCE LOW COST VIDEO GAME SYSTEM WITH COPROCESSOR PROVIDING HIGH SPEED EFFICIENT 3D GRAPHICS AND DIGITAL AUDIO SIGNAL PROCESSING", and U.S. patent application Ser. No. 09/722,667 of CHENG et al., entitled "METHOD AND APPARATUS FOR PRE-CACHING DATA IN AUDIO MEMORY" filed Nov. 28, 2000, both incorporated herein by reference.

Figure 2:
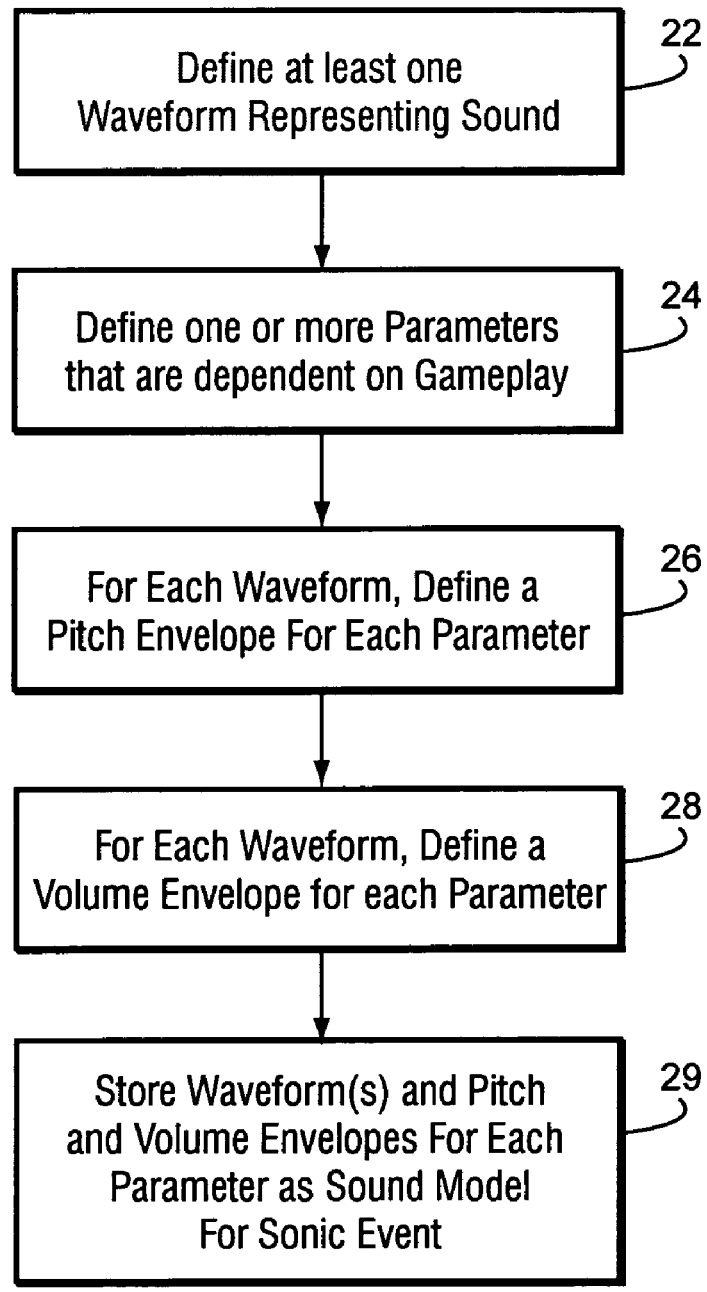
FIG. 2 shows a high level flow chart of the main steps used to create a sound model for a sonic event in accordance with the instant invention.

FIG. 2 shows a high level block diagram of the steps used to create a sound model in accordance with the instant invention. The sound model is designed to model a sonic event, condition or environment that could exist in the multimedia application. The sound model defines the information necessary for determining how the sound(s) for the sonic event are to be adjusted based on the parameter(s). Thus, the sound model includes one or more waveforms representing sounds, one or more parameters, and, for each waveform and each parameter, a corresponding pitch adjustment function and/or volume adjustment function. The pitch and volume adjustment functions are referred to herein as a pitch envelope and a volume envelope, respectively. Visually speaking, a pitch envelope provide a graph showing the change in pitch for a waveform as a function of a parameter, and the volume envelope provides a graph showing the change in volume for a waveform as a function of a parameter. In the preferred embodiment, the sound model provides a collection of waveforms, whose pitch and volume are adjusted based on the envelopes for any number of parameters.

As shown in FIG. 2, the first step in creating a sound model is to define at least one waveform representing sound (step 22). The next step involves defining one or more parameters that are dependent on the application in which the sonic event is to occur, such as one or more parameters that depend on a user's operation of a joystick or other control member during play of a video game (step 24). For example, if the application is a car racing videogame, a defined parameter could be the amount of power that the user gives the virtual car as a result of manipulation of the joystick on the game controller. Another parameter could be the speed at which the virtual car is moving in the game or the angle at which the user causes the virtual car to hit another car or other obstacle. Any suitable parameter, as well as any number of different parameters, can be defined by the person creating the sound model.

Once the waveforms and the parameters are defined for the sound model, the next step is to define, for each waveform, a pitch envelope for each parameter (step 26). This involves defining a functional relationship between the pitch of each waveform and the value of each parameter (see, for example, FIGS. 6 and 7). The next step is to define, for each waveform, a volume envelope for each parameter (step 28). The volume envelopes define the functional relationship between the volume of each waveform and the value of each parameter (see, for example, FIGS. 3, 4, and 5). While it is preferred to define a pitch and volume envelope for each waveform and each parameter, other embodiments may be used wherein only certain waveforms are adjusted by certain parameters, and/or certain parameters only effect the volume or pitch of one or more waveforms in the model. Once defined, the waveform(s) and pitch and volume envelopes for each parameter are stored as a sound model for the sonic event. Additional sound models can also be created and stored in order to model a variety of virtual sonic events that may arise or be present in a gaming or other application.

Figure 3:
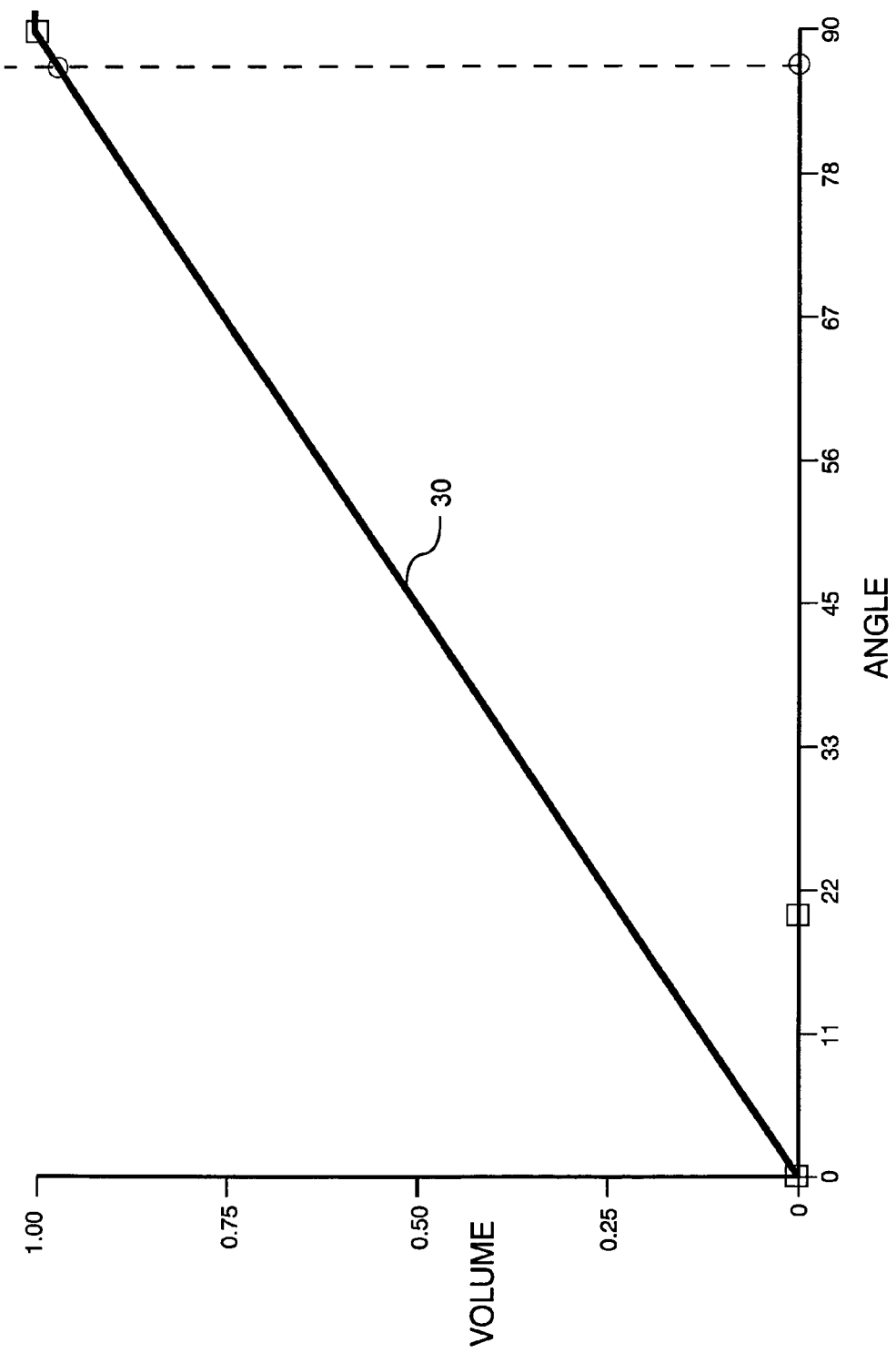
FIG. 3 shows an exemplary volume envelope for an angle parameter.

FIG. 3 shows an example of a volume envelope 30 for a waveform representing a collision sound based on the parameter "angle". This angle parameter represents the angle at which two objects collide in a gaming application, such as the angle at which one virtual racing car hits another virtual racing car. As shown in FIG. 3, the volume increases substantially linearly from a minimum value of about 0 to a maximum value of 1 as the collision angle increases from a very slight angle (close to 0—a glancing blow)) to a 90 degree angle (a head-on collision). In this example, an angle of 85 degrees would result in a volume of 0.85. Thus, the volume of the waveform is parameterized by the angle parameter. The volume for this waveform in the sound model is then determined based on the current value of the angle parameter.

Figure 4:
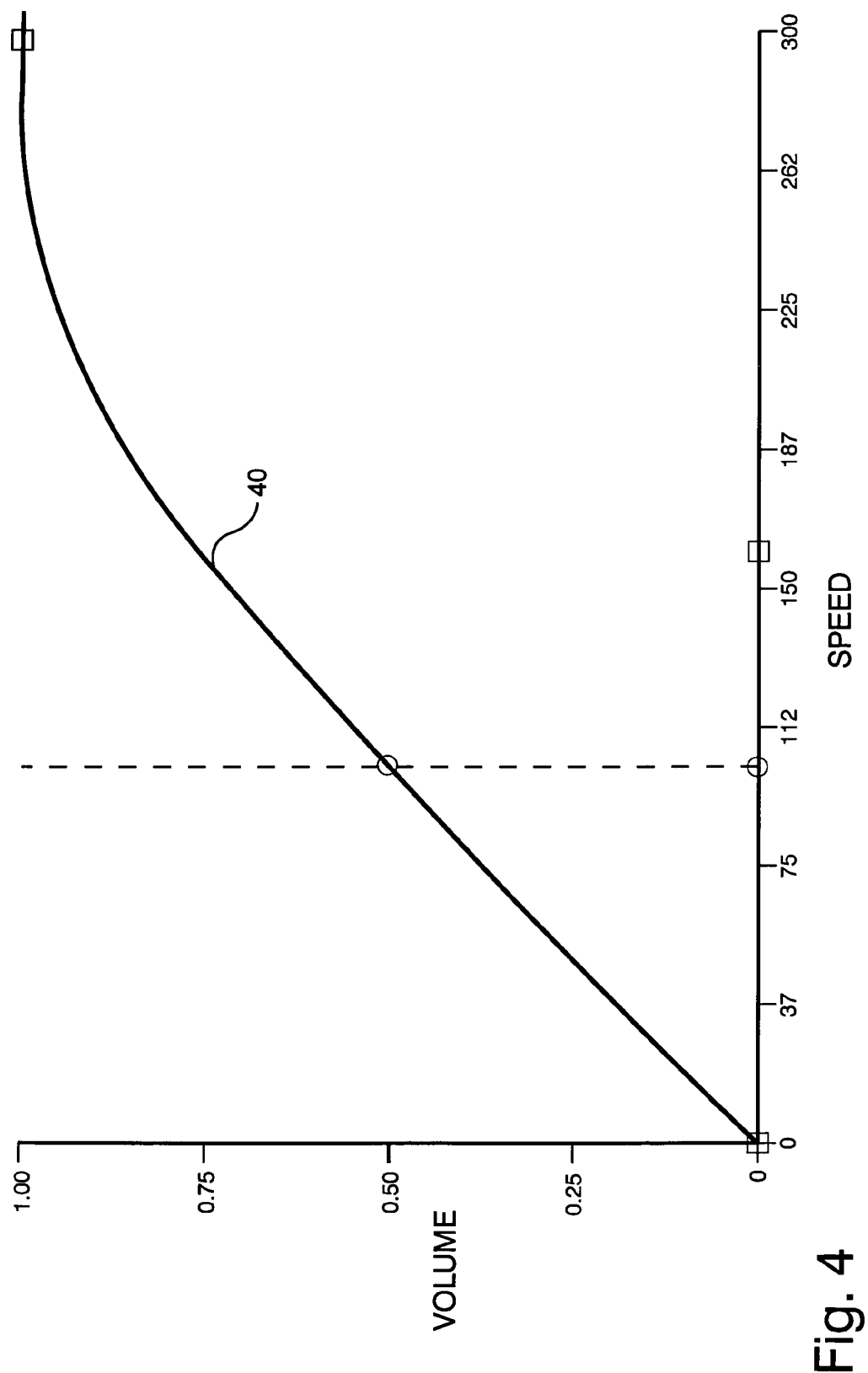
FIG. 4 shows an exemplary volume envelope for a speed parameter.

FIG. 4 shows an example of a volume envelope 40 for a waveform based on the parameter "speed". This speed parameter represents the speed at which an object, such as a virtual racing car is moving. As shown in FIG. 4, the volume increases substantially linearly from no speed to a speed of about 187 mph, and then increases at a progressively slower rate to the maximum volume of 1 as the vehicle increases its speed from 187 to 300 mph. In this example, the speed of 100 will result in a volume of 0.5.

The volume envelopes of FIGS. 3 and 4 can be used in, for example, a sound model for a car hitting a wall having a first parameter "angle" and a second parameter "speed." In this example, if the car hits the wall at 100 mph and at an angle of 0.85, the final waveform could be determined by multiplying or otherwise combining the parameterized volumes (e.g., 0.5×0.85=0.425). This example assumes a constant pitch. However, this exemplary car accident model could be further enhanced by the addition of pitch envelopes for the parameters, as well as adding several additional waveforms overlapping each other in volume and/or pitch, thereby resulting in a complex and dynamic sound model. Additional parameters could also be added to increase the complexity and depth of the sound. For example, a third parameter representing the thickness of the surface the car hits could be added to adjust the sound accordingly, such as by decreasing the pitch as the thickness decreases to give a more "hollow" sound to the collision. Thus, in accordance with the preferred embodiment of the invention, the resulting output for each waveform that is contained in the sound model is based on the adjustment to pitch and volume that the first parameters envelope performs on the sound, subsequently modulated by the adjustment to pitch and volume that the second parameter's envelope performs on the sound, and so on.

Figure 5:
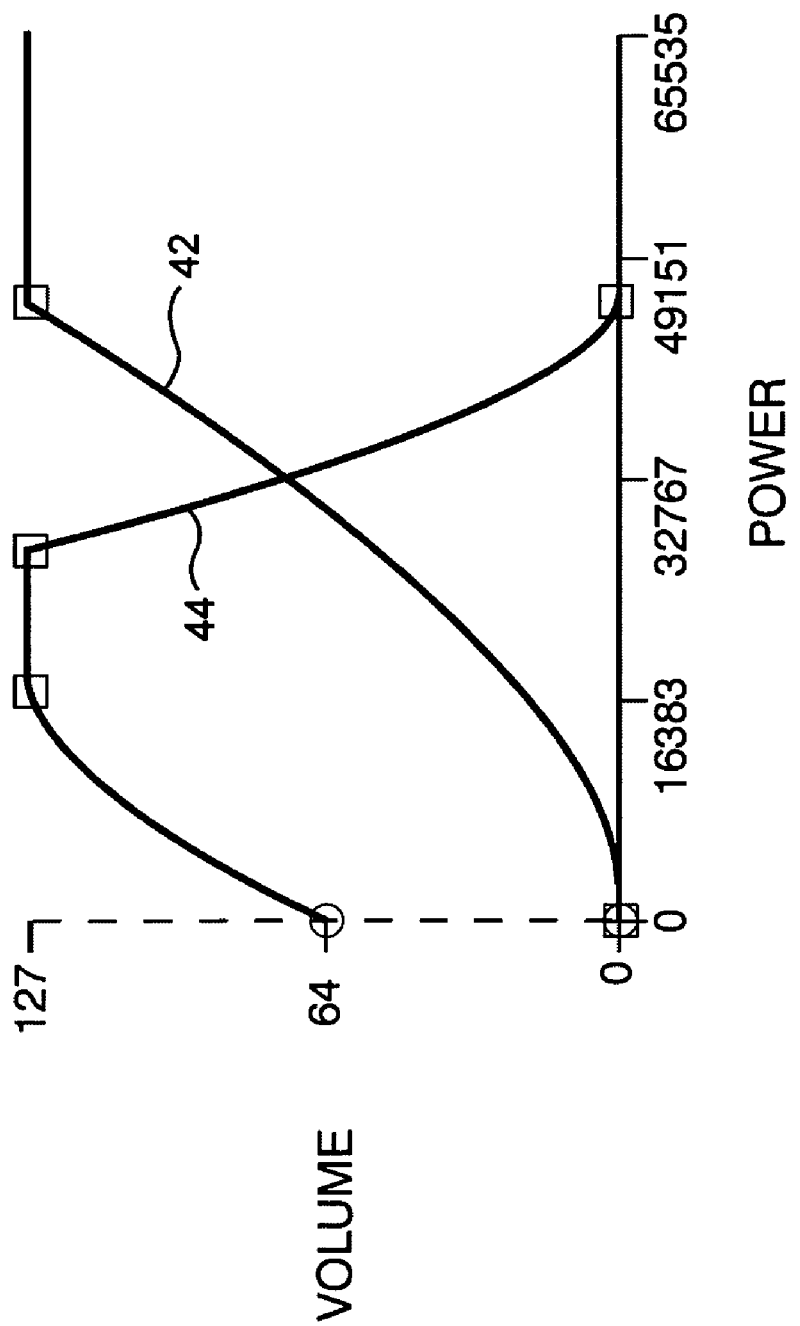
FIG. 5 shows an exemplary volume envelope for two waveforms based on a power parameter.
Figure 6:
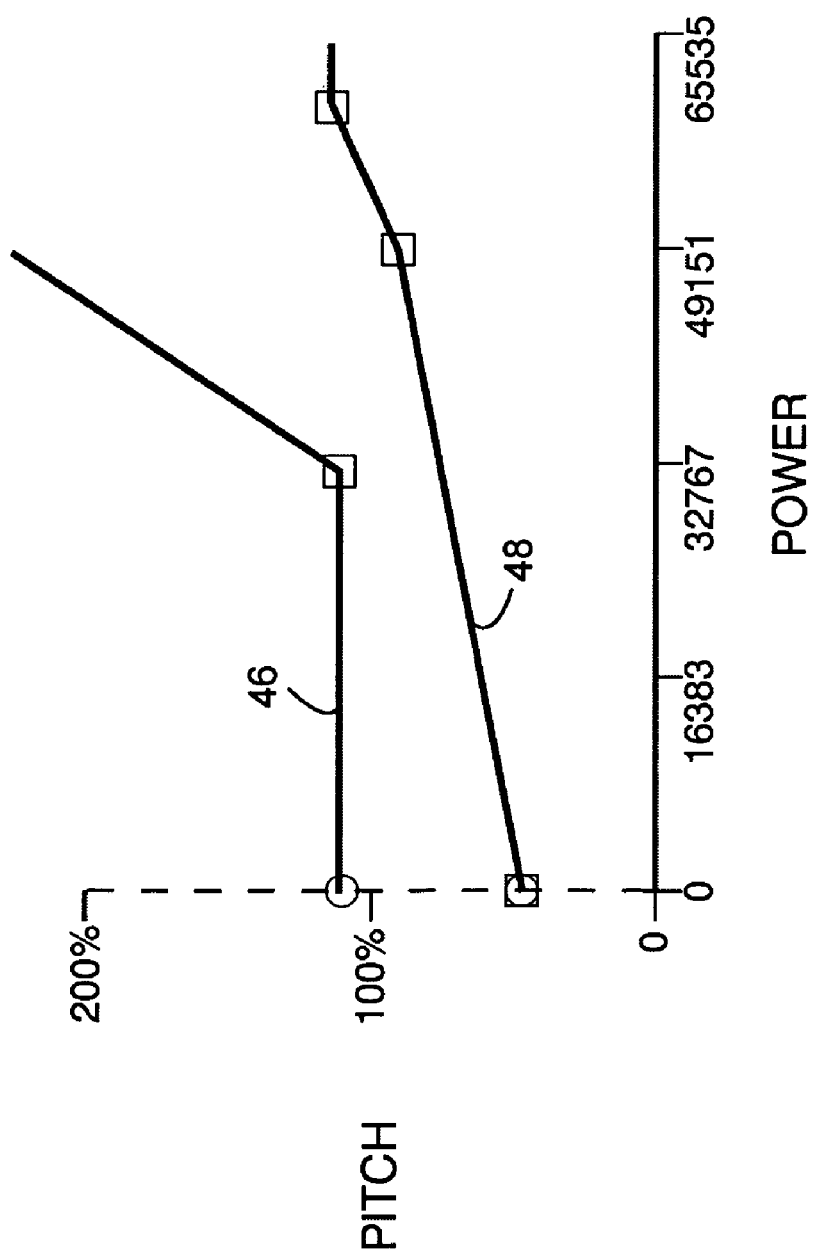
FIG. 6 shows an exemplary pitch envelope for two waveforms based on a power parameter.
Figure 7:
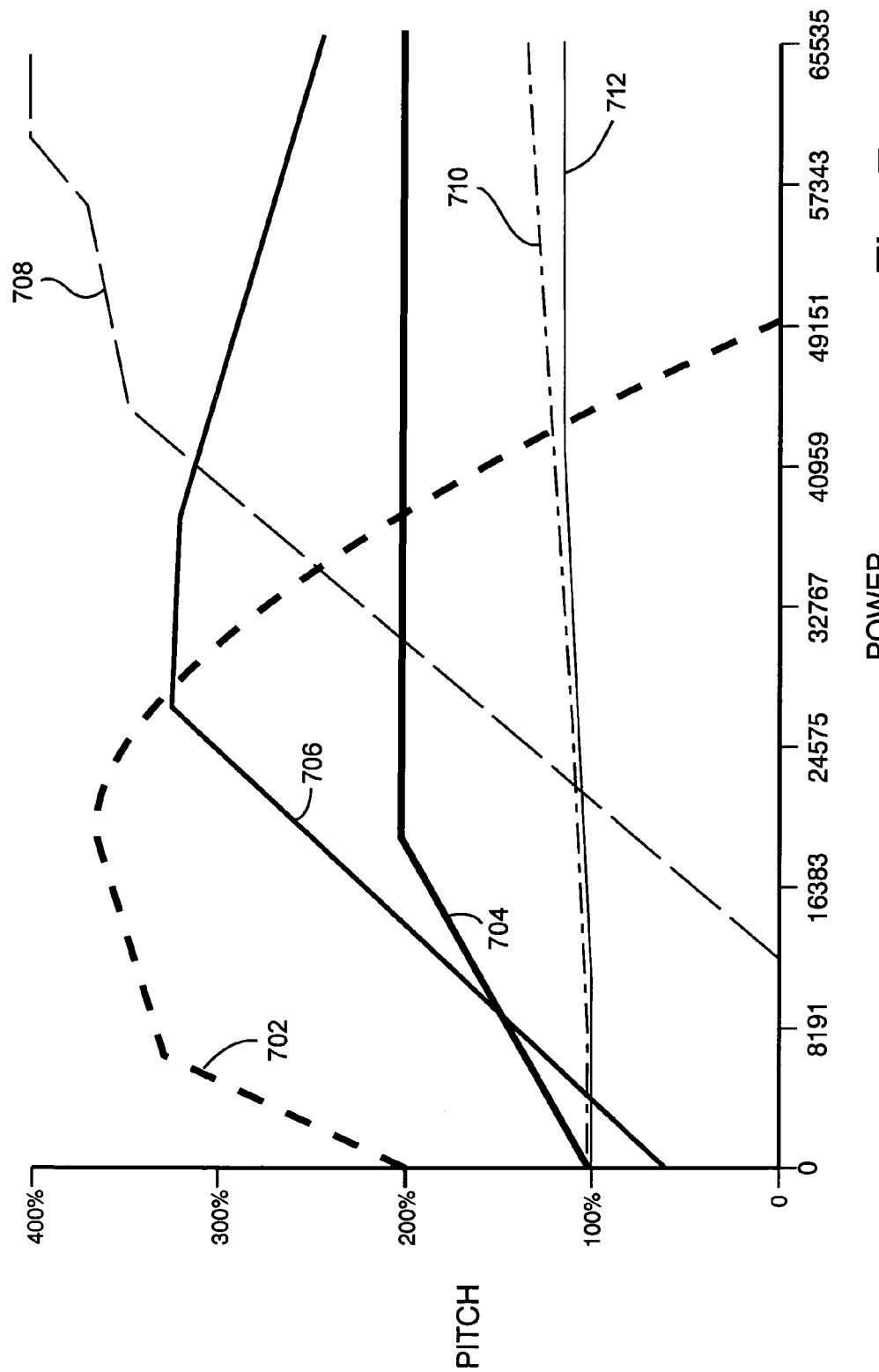
FIG. 7 shows an exemplary pitch envelope for several waveforms.

FIG. 5 shows a pair of exemplary volume envelopes (42, 44) for two waveforms based on the parameter "power." FIG. 6 shows a pair of exemplary pitch envelopes (46, 48) for two waveforms based on the parameter "power." The envelopes of FIGS. 5 and 6 could be used to define a sound model having four waveforms, each adjusted in volume and pitch by the parameter "power". FIG. 7 shows additional exemplary pitch envelopes (702, 704, 706, 708, 710 and 712) for the parameter "power."

Figure 8:
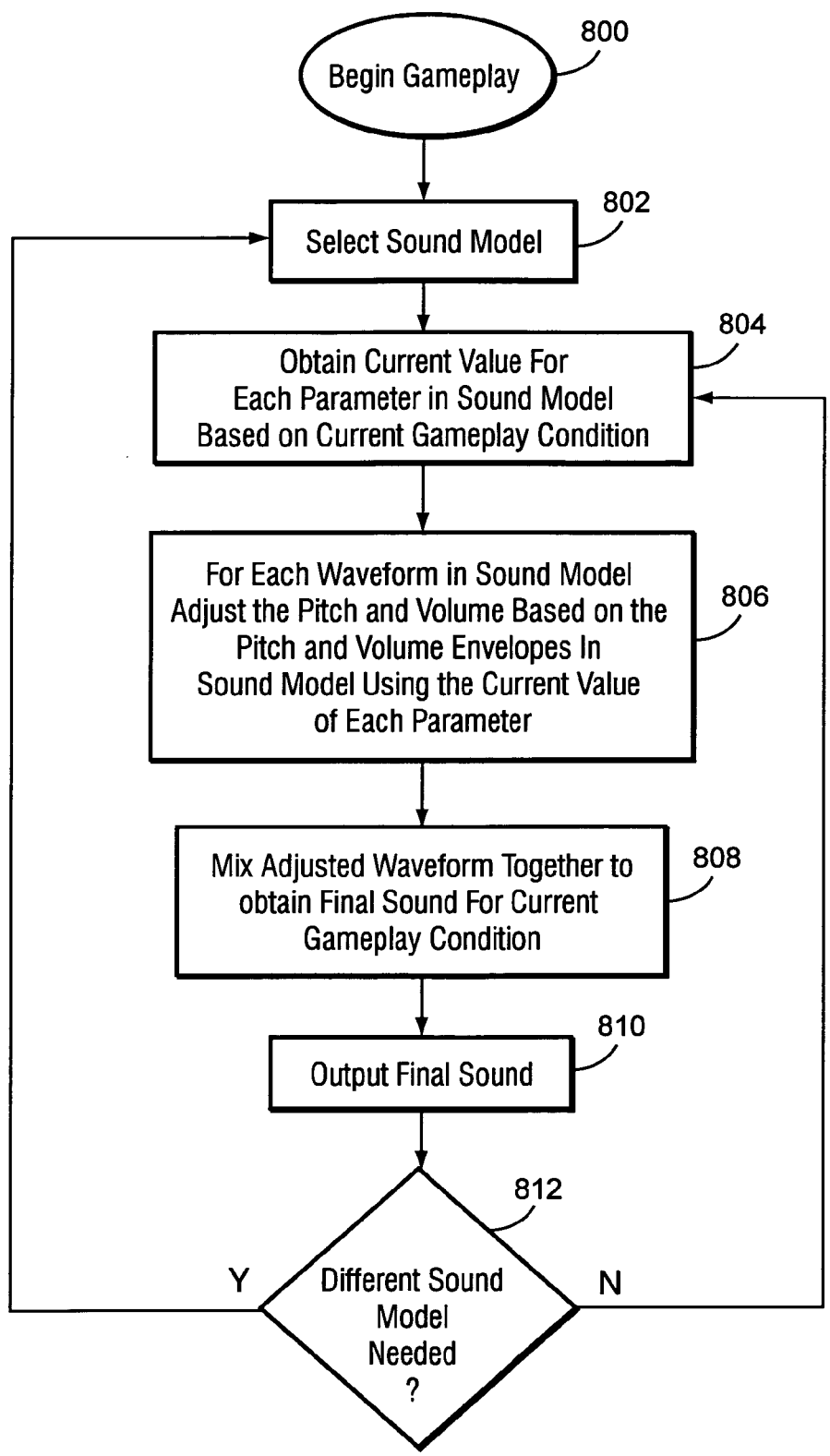
FIG. 8 shows a high level flow chart of the main steps used to generate final sound using a sound model in accordance with the instant invention.

FIG. 8 shows a high level flow chart of the preferred steps performed in accordance with the invention for generating sound effects using sound models of the present invention. The process begins by starting the application, such as beginning gameplay on a videogame platform (step 800). If there are several sound models available for the application, then a first step involves selecting the appropriate sound model for the current condition of the game (step 802). The system then obtains the current value for each parameter in the sound model based on the current gameplay condition (step 804), such as how fast the user is causing a virtual racing car to travel and how much power he/she is giving to the vehicle. Then, for each waveform in the sound model, the pitch and volume is adjusted based on the pitch and volume envelopes in the sound model using the current value of each parameter (step 806). The adjusted waveforms are then mixed together to obtain the final sound for the current gameplay condition (step 808). The final sound is then output through the audio system (step 810). The process is then repeated using the same or different sound model (step 812) and using the next current value of the parameters. In this way a continuous, complex and dynamic sound effects can be generated for the videogame (or any other suitable application).

Figure 9:
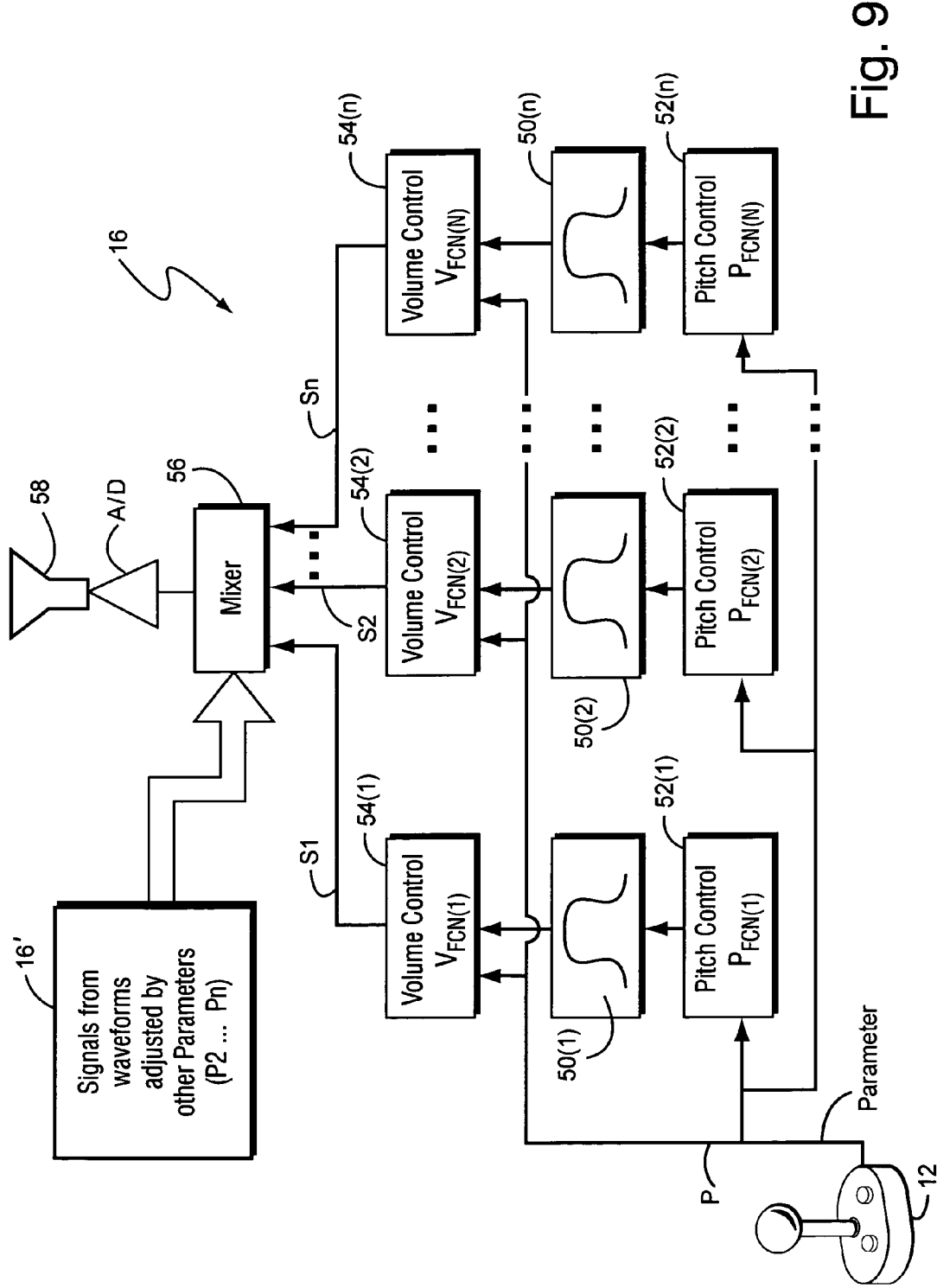
FIG. 9 shows an example sound generation engine in accordance with a preferred example embodiment of the instant invention.

FIG. 9 shows a more detailed block diagram of an exemplary sound effects engine 16 provided by the preferred embodiment of the present invention. In this example, the user manipulable control 12 (e.g. joystick) generates a control parameter P used to control the read out of a plurality of digitally stored sound wave tables 50 (defining the waveforms for a sound model). Storage of digital sound samples in wave tables 50 is well known. In this particular embodiment, a user-controlled parameter P is used to vary the pitch of the wave table read out via a pitch control 52 and/or the amplitude of the wave table read out via volume control 54. Different or more complex wave table read out variations are also or alternatively possible, but the inventors have found that great flexibility can be provided by varying the pitch and/or volume envelopes of wave tables 50 based on one or more parameters. The resulting simultaneous streams of digital samples S1, S2, . . . , Sn read out from wave tables 50 are mixed together by a mixer 56 before being applied to a loudspeaker 58 via an analog-to-digital converter for conversion into audible sound. In this example embodiment, the transfer functions (or envelopes) of the various pitch control blocks 52 and volume control blocks 54 are different, and these transfer functions, $V_{FCN}$, $P_{FCN}$ are customized with respect to the input parameter P. For example, see FIG. 7 representing read out of multiple wave tables 50 at variable pitches controlled by a "power" parameter P. As shown in illustrative FIG. 7, for a power factor set to a minimal level, the pitch control 52(1) associated with the first wave table 50(1) read out may be set to 200% whereas the pitch control 52(2) associated with the read out of a further wave table 50(2) may be set to 100%. As the power parameter P is increased (e.g., by a user pushing analog joystick 12 forward), the pitch control block 52(1) may sharply increase the pitch applied to the read out of wave table 50(1) to 350% or so before providing a relatively linear decrease to 0% (see curve 702). In contrast, for the same operation of joystick 12, the pitch control block 52(2) associated with read out of wave table 50(2) may increase the pitch from 100% to 200% with a maximum roughly corresponding to the same maximum of curve 702 and then maintaining the pitch at an approximately constant value based on further increases in the power parameter P (see curve 704). As also shown in FIG. 7, additional characteristic pitch transfer functions $P_{FCN}$ (or envelopes) associated with further wave tables 50(n) can be used to provide additional wave table read out pitch control based on the same parameter P in order to provide an even more complex and rich sound effect. In a similar manner, the volume control blocks 54 associated with the various plurality of wave table 52 read outs can provide different transfer functions (or envelopes) based upon a common parameter P. Further streams of digital samples may be provided by other pitch controls and volume controls based on the same or other wave tables using other parameters ($P_2 \ldots P_n$) (as indicated by block 16').

Many different complex sound effects can be created through providing such customized transfer functions for different wave table 50 read outs. For example, the inventors have successfully simulated the sound of a racing car engine increasing in engine speed from idle to racing speeds. The inventors have also successfully simulated the sound of rain changing from light rain to very heavy rain using these techniques. An almost infinite number of variations in wave tables and associated transfer functions controlling wave table read out and/or modification can be used to provide any desired sound effect.

As will be understood, the various volume control and pitch control transfer functions $V_{fcn}(1) \ldots V_{fcn}(n)$ and $P_{fcn}(1) \ldots P_{fcn}(n)$ may be specified by equations, through lookup tables, by multiplication or other combination with reference digital strings, or via any other convenient method.

The example embodiment parameterized the volume control blocks 54 and pitch control blocks 52 with a parameter P responsive to user manipulation of control 12. In other embodiments, parameter P can be supplied by some other source (e.g., execution of a video game) or by a combination of user interactivity and non-user interactivity. In other words, the parameters used in accordance with the instant invention can be directly or indirectly related to user interactivity.

While the embodiment has been described above as "simultaneously" reading out the contents of multiple wave tables 50, it will be understood by those or ordinary skill in the art that truly simultaneous read out is not generally possible in a single-processor sound generation system. In such single-processor systems, for example, it may be that one wave table 50(1) may be processed first and then a second wave table 50(2) may then be processed, with the results of the two processes subsequently combined by a mixer 56 before application to loudspeaker 58. By the term "simultaneous", we do not intend to restrict our invention to true simultaneous operations, but rather intend to encompass substantially real-time concurrent processing of multiple wave tables so that a human ear hears the results of multiple wave table processing as part of the same overall effect.

EXAMPLE ILLUSTRATIVE IMPLEMENTATION

Figure 10A:
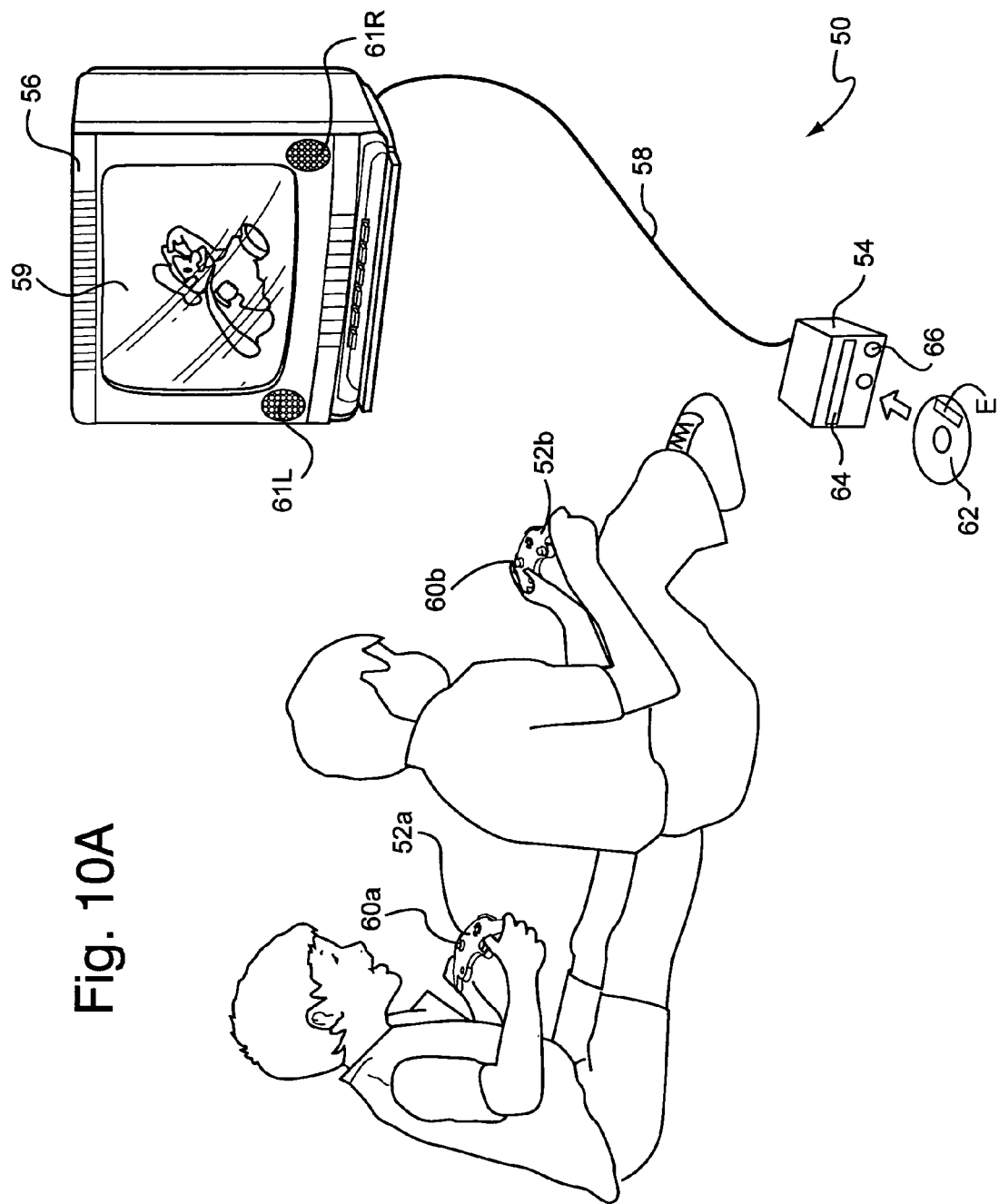
FIGS. 10a and 10b show an exemplary illustrative overall video game system that can be used to implement the instant invention.
Figure 10B:
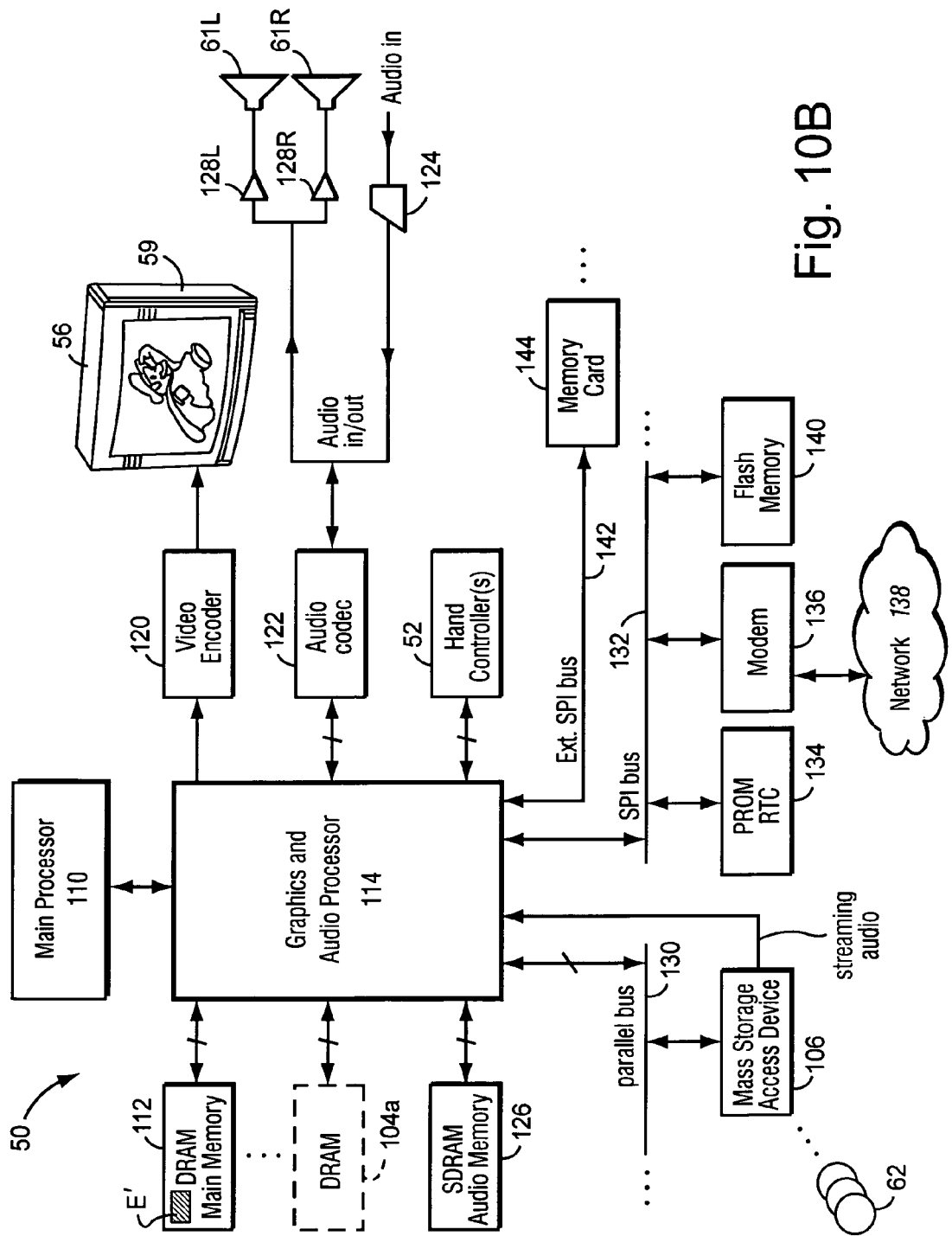

FIGS. 10A and 10B show an example interactive 3D computer graphics system 50. System 50 can be used to play interactive 3D video games with interesting displays and sound effects provided by a preferred embodiment of this invention. System 50 can also be used for a variety of other applications.

In this example, system 50 is capable of processing, interactively in real time, a digital representation or model of a three-dimensional world. System 50 can display some or the entire world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting gameplay or other graphical interactions.

To play a videogame or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R. The sounds played are generated using the sound model and sound generation technique of the instant invention.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations. The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves. The parameters for use in connection with the sound models of the present invention can be obtained from the controllers 52.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

As also shown in FIGS. 10A and 10B, mass storage device 62 stores, among other things, a videogame program E that enables an interactive game to be played using the system 50 and incorporates the sound generation feature of the instant invention. The program E in the preferred embodiment makes use of various components of system 50 shown in FIG. 10B including:

a main processor (CPU) 110, a main memory 112, and a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video gameplay, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices. Main processor 110 and graphics and audio processor 114 also perform functions to support and implement the preferred embodiment program E based on instructions and data E' relating to the program that is stored in DRAM main memory 112 and mass storage device 62.

As further shown in FIG. 10B, example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

While the invention has been described in connection with its most preferred embodiments, other variations are possible. For example, while the invention has been described in connection with a video game or other multimedia presentation including both graphics and sound, the invention could alternatively be used in an audio-only context without graphics. Additionally, while the invention has been described in connection with the embodiment used to generate sound effects, other types of sounds (e.g., music or other audible information) could be generated. Accordingly, the invention is not to be limited to the disclosed exemplary embodiments, but on the contrary, is intended to cover all variations and equivalents within the scope of the claims.

We claim:

1. A method of creating a sound model for use in dynamically generating sound effects during execution of a computerized multimedia application in which a user provides input that affects both video and sound produced by the multimedia application, said method comprising:

defining a plurality of waveforms representing various different sounds that may be generated simultaneously by a single sound generating object during execution of the interactive multimedia application;

defining a parameter that relates to the sound generating object and is variable during execution of the multimedia application;

defining an adjustment function, for each of the plurality of waveforms, between the parameter and at least one characteristic of each of the plurality of waveforms, wherein each adjustment function provides a functional relationship between a value of the parameter and a value of the characteristic of the respective waveform, and further wherein the plurality of waveforms, the parameter and the adjustment functions define the sound model;

displaying a graph showing the adjustment function for each of the plurality of waveforms, the graph visually depicting during game development by a game designer one or more relationships existing between each of the adjustment functions;

storing the sound model for use in dynamically generating sound effects during execution of the multimedia application; and using the stored sound model to dynamically generate sound effects during execution of the multimedia application.

2. A method of creating a sound model as in claim 1, wherein defining a parameter includes defining a parameter that varies based at least in part on user interactivity with the multimedia application.

3. A method of creating a sound model as in claim 1, wherein the characteristic of the waveform is volume of the waveform, and defining an adjustment function includes defining a volume adjustment function.

4. A method of creating a sound model as in claim 1, wherein the characteristic of the waveform is pitch of the waveform, and defining an adjustment function includes defining a pitch adjustment function.

5. A method of creating a sound model as in claim 1, wherein the parameter is a non-time based parameter.

6. A method of creating a sound model as in claim 1, further including defining a plurality of different parameters, each of which relates to the sound generating object and is variable during execution of the multimedia application, and defining a plurality of adjustment functions, for each of the plurality of waveforms, that respectively define how a characteristic of the waveforms varies with respect to each of the parameters.

7. A method of creating a sound model as in claim 6, wherein each of the plurality of different parameters varies based at least in part on user interactivity with the multimedia application.

8. A method of creating a sound model as in claim 6, wherein the characteristic of the waveform is volume of the waveform, and the plurality of adjustment functions are volume adjustment functions.

9. A method of creating a sound model as in claim 6, wherein the characteristic of the waveform is pitch of the waveform, and the plurality of adjustment functions are pitch adjustment functions.

10. A method of creating a sound model as in claim 6, wherein the parameters are non-time based parameters.

11. A method of creating a sound model as in claim 1, wherein the sound model models a sonic event that relates to the sound generating object and may occur in the interactive multimedia application.

12. A method of creating a sound model as in claim 1, wherein the sound model models a sonic condition that may exist in the interactive multimedia application.

13. A method of creating a sound model as in claim 1, wherein the sound model models a sonic environment that may exist in the interactive multimedia application.

14. A method of creating a sound model for dynamically generating sound effects during execution of a computerized multimedia application in which a user provides input that affects both video and sound produced by the multimedia application, said method comprising:

defining a plurality of waveforms representing various different sounds that may be generated simultaneously by a single sound generating object during execution of the interactive multimedia application;

defining a parameter that relates to the sound generating object and is variable during execution of the multimedia application;

defining an adjustment function, for each of the plurality of waveforms, between the parameter and at least one characteristic of each of the plurality of waveforms, wherein each adjustment function provides a functional relationship between a value of the parameter and a value of the characteristic of the respective waveform, and further wherein the plurality of waveforms, the parameter and the adjustment functions define the sound model;

displaying a graph showing the adjustment function for each of the plurality of waveforms, the graph visually depicting during game development by a game designer one or more relationships existing between each of the adjustment functions;

storing the sound model for use in dynamically generating sound effects during execution of the multimedia application; and using the stored sound model to dynamically generate sound effects during execution of the multimedia application by determining a current value of the parameter based on a current application condition, adjusting the plurality of waveforms using the current value of the parameter and the adjustment functions, and outputting sound based at least in part on the plurality of adjusted waveforms.

15. A method of creating a sound model as in claim 14, wherein defining a parameter includes defining a parameter that varies based at least in part on user interactivity with the multimedia application.

16. A method of creating a sound model as in claim 14, wherein the characteristic of the waveform is volume of the waveform, and defining an adjustment function includes defining a volume adjustment function.

17. A method of creating a sound model as in claim 14, wherein the characteristic of the waveform is pitch of the waveform, and defining an adjustment function includes defining a pitch adjustment function.

18. A method of creating a sound model as in claim 14, wherein the parameter is a non-time based parameter.

* * * * *